June 6, 1961 B. L. BRUCKEN 2,986,914
LAUNDRY APPLIANCE
Filed March 11, 1955 14 Sheets-Sheet 1

INVENTOR.
Byron L. Brucken
BY RRCandor
His Attorney

June 6, 1961 B. L. BRUCKEN 2,986,914
LAUNDRY APPLIANCE
Filed March 11, 1955 14 Sheets-Sheet 2
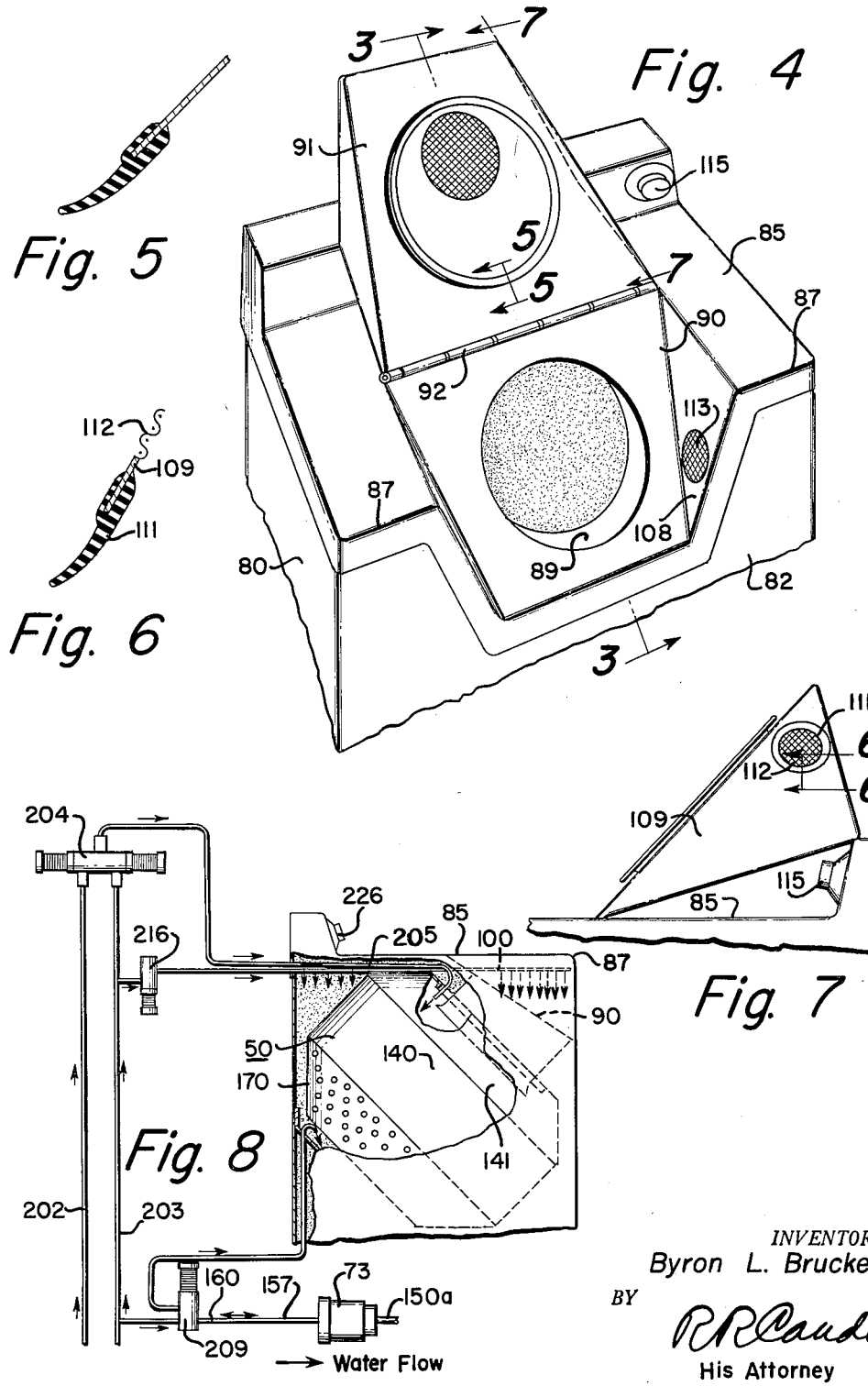
INVENTOR.
Byron L. Brucken
BY
His Attorney WASH AND RINSE CYCLES
→ Water Flow INVENTOR.
Byron L. Brucken
BY
His Attorney June 6, 1961 B. L. BRUCKEN 2,986,914
LAUNDRY APPLIANCE
Filed March 11, 1955 14 Sheets-Sheet 4

SPIN CYCLE
→ Water Flow

INVENTOR.
Byron L. Brucken
BY R. R. Caudor
His Attorney

DRY CYCLE
→ Water Flow
--→ Air Flow

INVENTOR.
Byron L. Brucken
BY R R Caudor
His Attorney

June 6, 1961    B. L. BRUCKEN    2,986,914
LAUNDRY APPLIANCE
Filed March 11, 1955    14 Sheets-Sheet 7
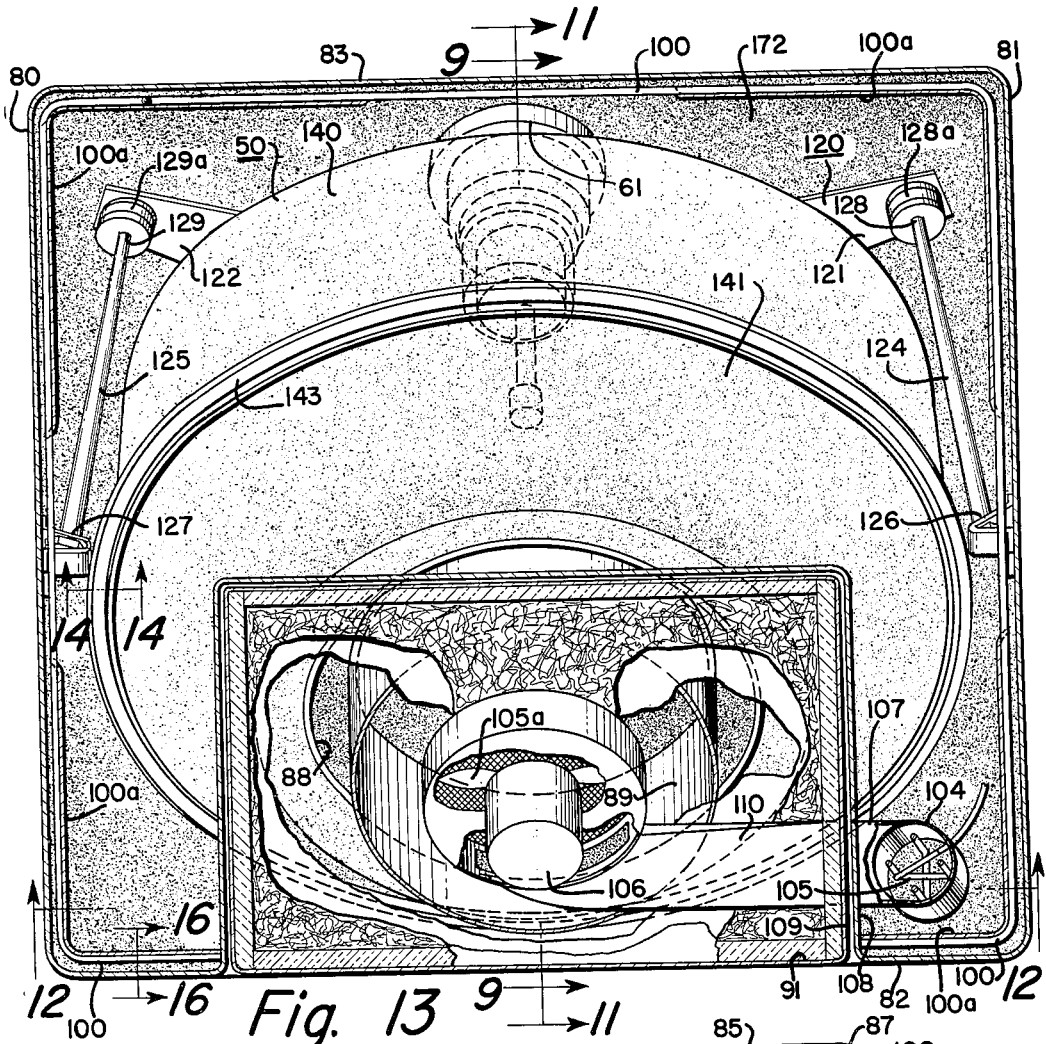
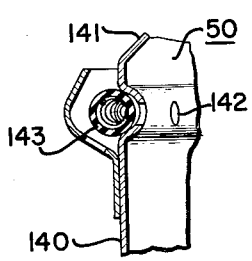
Fig. 14
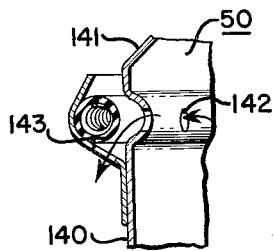
Fig. 15
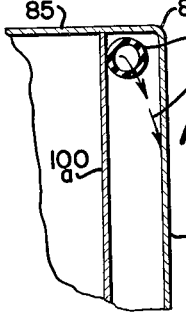
Fig. 16
INVENTOR.
Byron L. Brucken
BY R R Caudor
His Attorney June 6, 1961  B. L. BRUCKEN  2,986,914
LAUNDRY APPLIANCE
Filed March 11, 1955  14 Sheets-Sheet 8

INVENTOR.
Byron L. Brucken
BY
His Attorney

June 6, 1961   B. L. BRUCKEN   2,986,914
LAUNDRY APPLIANCE
Filed March 11, 1955   14 Sheets-Sheet 9

INVENTOR.
Byron L. Brucken
BY
RRCauder
His Attorney

June 6, 1961 B. L. BRUCKEN 2,986,914
LAUNDRY APPLIANCE
Filed March 11, 1955 14 Sheets-Sheet 10

INVENTOR.
Byron L. Brucken
BY
His Attorney

June 6, 1961 B. L. BRUCKEN 2,986,914
LAUNDRY APPLIANCE
Filed March 11, 1955 14 Sheets-Sheet 11
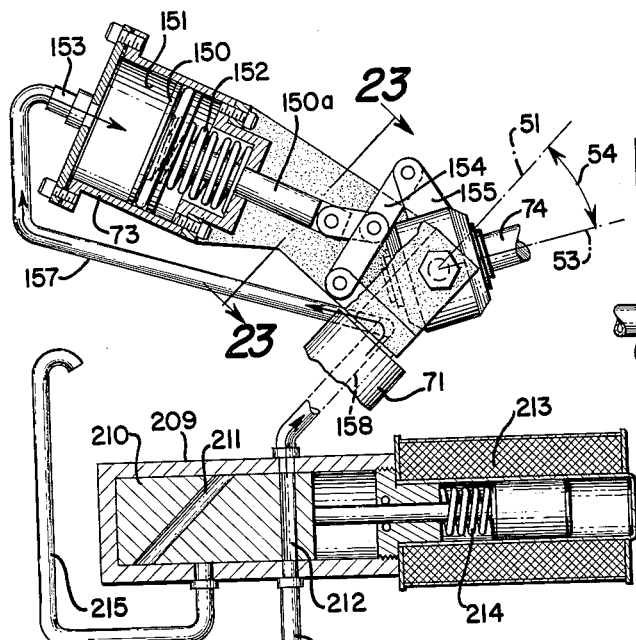
Fig. 21
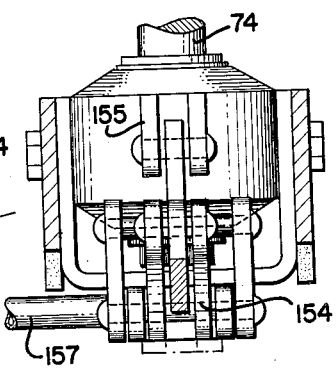
Fig. 23
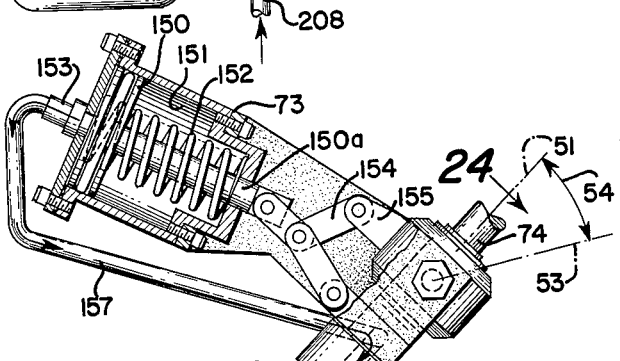
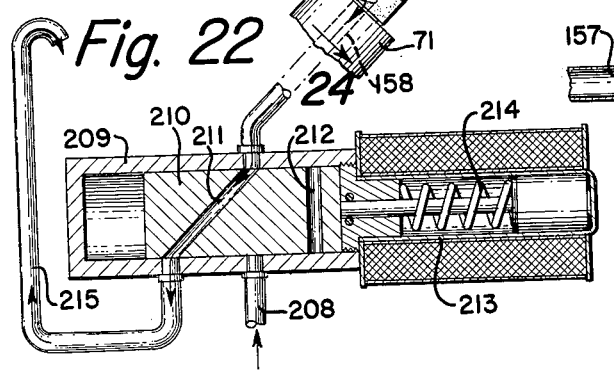
Fig. 22
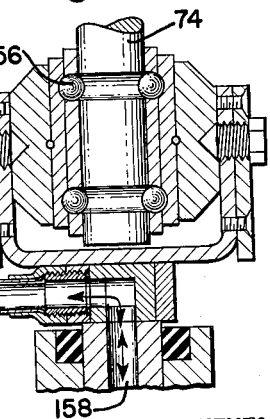
Fig. 24
INVENTOR.
Byron L. Brucken
BY
His Attorney INVENTOR.
Byron L. Brucken
His Attorney INVENTOR.
Byron L. Brucken

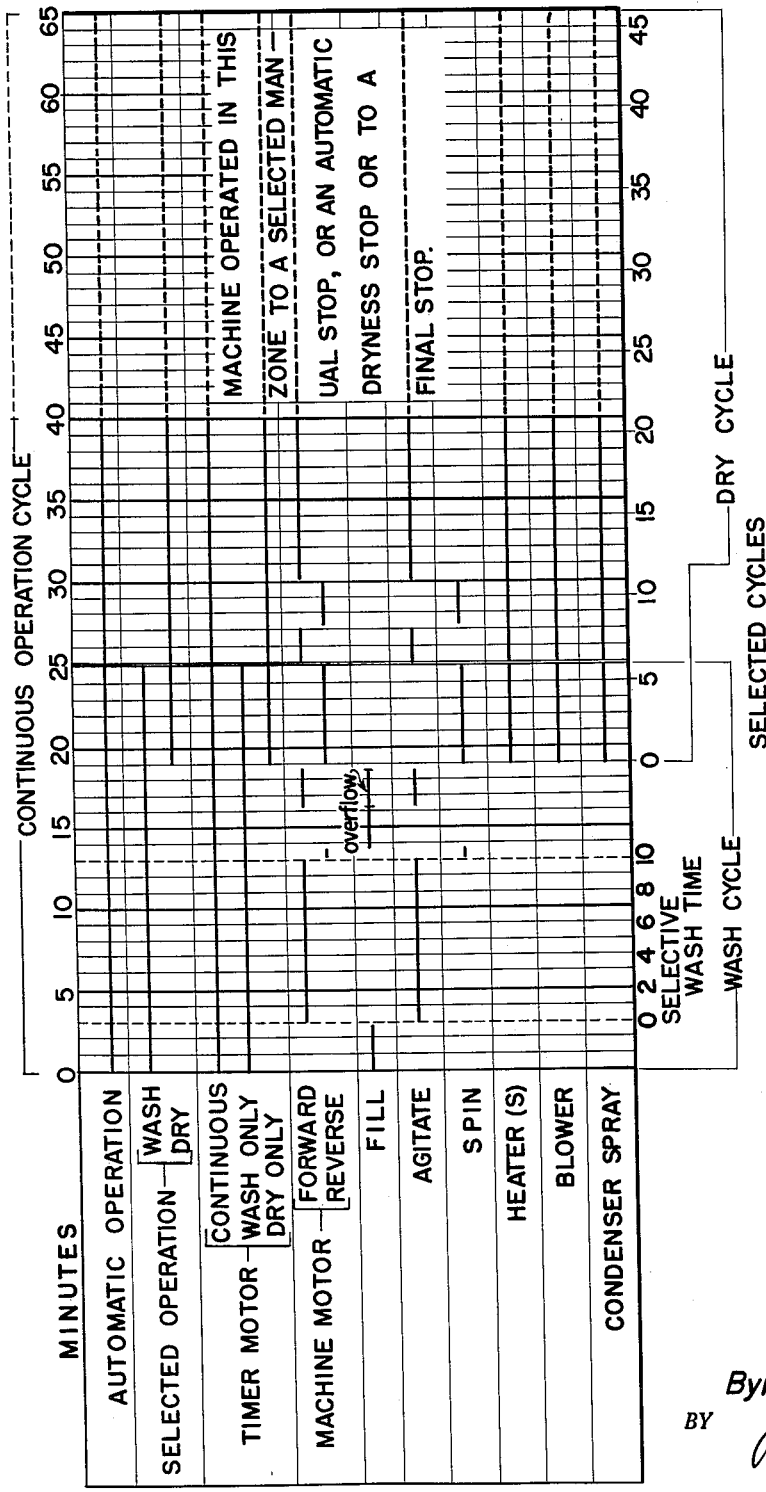

Patented June 6, 1961

1

**2,986,914
LAUNDRY APPLIANCE**
Byron L. Brucken, Dayton, Ohio, assignor to General Motors Corporation, Detroit, Mich., a corporation of Delaware
Filed Mar. 11, 1955, Ser. No. 493,736
14 Claims. (Cl. 68—12)

This invention relates to domestic appliances and more particularly to a clothes washer and/or dryer.

An object of this invention is to provide a clothes washer having a tub mounted to rotate about an inclined axis, and provided with means for insuring improved clothes tumbling or fluffing action.

Another object of this invention is to provide a tub with a plate supported within the tub and rotatable about a movable axis to provide vigorous agitation or fluffing action in one position, and to provide symmetrical, counter-balanced surfaces during the spin operation.

Another object of this invention is to provide a washer and/or dryer with a generally right angled six-sided cabinet having a clothes loading and unloading opening at the forward upper edge of the cabinet without marring the symmetry of the cabinet.

Another object of this invention is to provide an improved cantilever support within a six-sided cabinet for a tub rotating about an inclined axis within the cabinet.

Another object of this invention is to provide an improved arrangement of air flow, with vapor condensing and air heating means within a washer-dryer cabinet.

Another object of this invention is to provide a tub with centrifugally operated discharge openings which are closed during the washing operation and are opened during the centrifuging operation.

Further objects and advantages of the present invention will be apparent from the following description, reference being had to the accompanying drawings wherein a preferred form of the invention is clearly shown.

In the drawings:

FIGURE 4 is a view in perspective of the top of the washer-dryer with the lid in open position.

FIGURE 5 is a cross-sectional detail of a sealing strip taken along the line 5—5 of FIGURE 4.

FIGURE 6 is a cross-sectional detail of a sealing strip taken along the line 6—6 of FIGURE 7.

FIGURE 7 is an elevation taken in the direction of the arrows of the line 7—7 of FIGURE 4.

FIGURE 8 is a diagrammatic view of the waterflow connections used in the washer-dryer.

FIGURE 13 is a horizontal cross-section taken along the line 13—13 of FIGURES 9, 10 and 11.

FIGURES 14 and 15 are cross-sections of the tub water discharge opening construction taken substantially along line 14—14 of FIGURE 13 and showing respectively the closed and open positions.

FIGURE 16 is a detail cross-section of the vapor condenser spray construction taken substantially along line 16—16 of FIGURE 13.

FIGURE 21 is a combined diagrammatic representation and cross-section of the mechanism for varying the axis of the plate within the tub with the plate in agitating-fluffing position.

FIGURE 22 is a view similar to FIGURE 21 showing the axis in a different position for centrifugal extraction.

FIGURE 23 is a cross-section along the line 23—23 of FIGURE 21.

FIGURE 24 is a cross-section along the line 24—24 of FIGURE 22.

Figure 20:
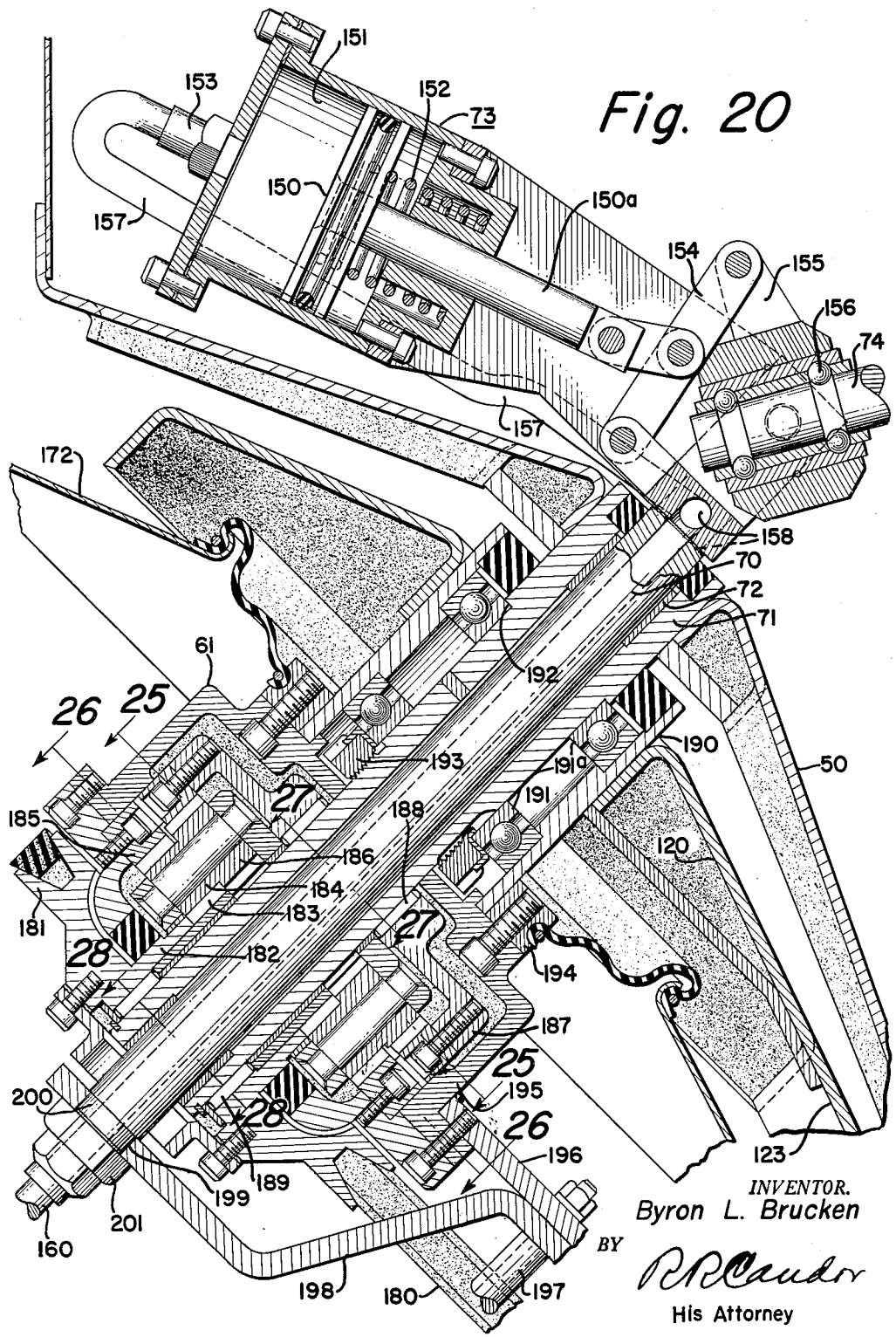
FIGURE 20 is a further enlargement and more detailed cross-section of a portion of FIGURE 19.
Figure 25:
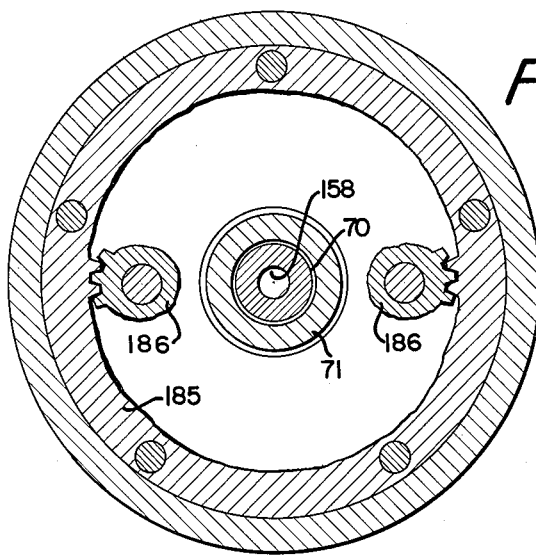
Figure 28:
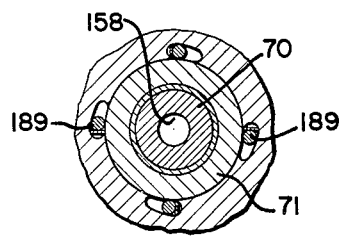
Figure 26:
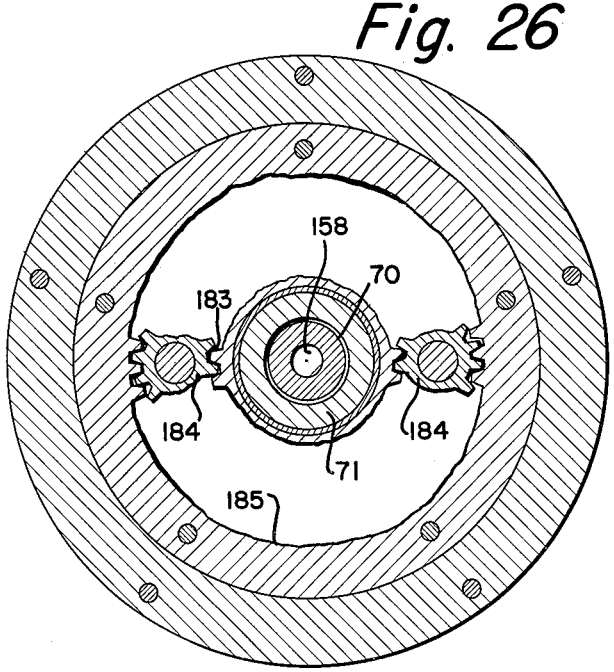
Figure 27:
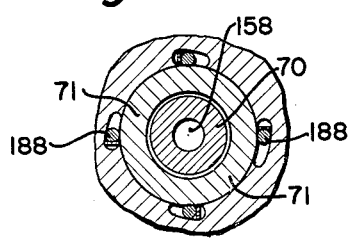

FIGURES 25 through 28 are partial cross-sections along the lines 25—25 through 28—28 of FIGURE 20.

Figure 29:
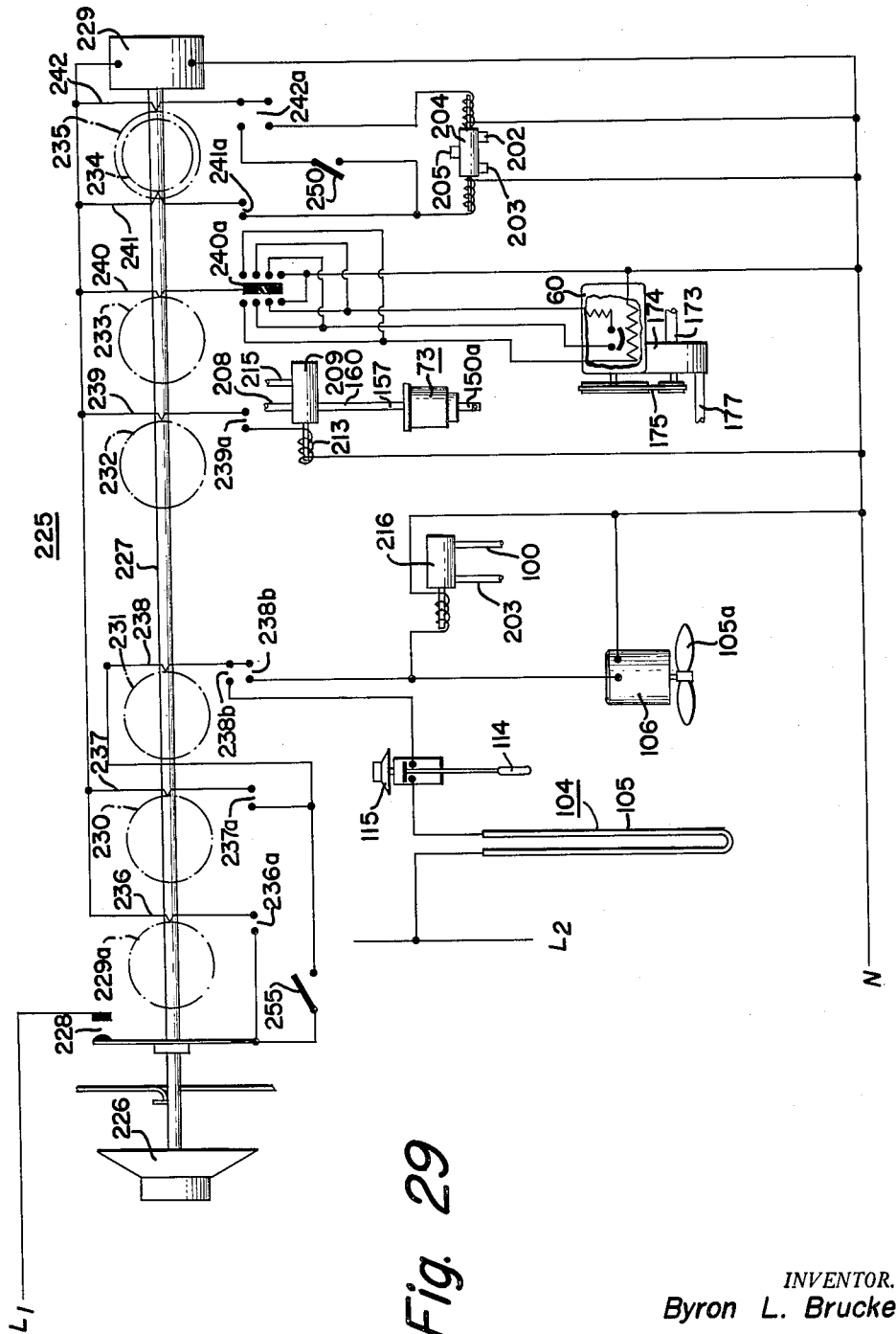

FIGURE 29 is a wiring diagram of the control system.

FIGURE 30 is a time diagram of the washing and drying operations.

The washer and/or dryer includes generally a tub 50 mounted to rotate about an inclined axis 51. A plate 52 is provided within the tub 50 and has a rotatable support permitting the plate to rotate about a movable axis 53. Preferably the axis 53 is movable to a position coaxial with the inclined axis 51, (FIGURES 10 and 22) during the centrifuging of the clothes within the tub, and to a position at an angle 54 from the axis 51 of the tub (FIGURES 9, 11 and 21) to provide vigorous agitating and fluffing actions of the clothes during the washing and drying operations. A flexible impervious diaphragm 55 is connected to the outer edge 56 of the plate 52 and to the upper edge 57 of the side wall of the tub 50 to form the water retaining bottom of the tub 50, in cooperation with the plate 52.

Means are provided for rotating the tub at relatively slow speed for agitation and fluffing, and at relatively high speed for centrifugal extraction. Such means may take the form of a motor 60, preferably reversible, and of a two-speed transmission 61, which drives the tub 50 at the two speeds previously described.

Clothes lifting vanes 62 may be provided on the plate 52 to improve the agitating and fluffing actions performed on the clothes.

Figure 1:
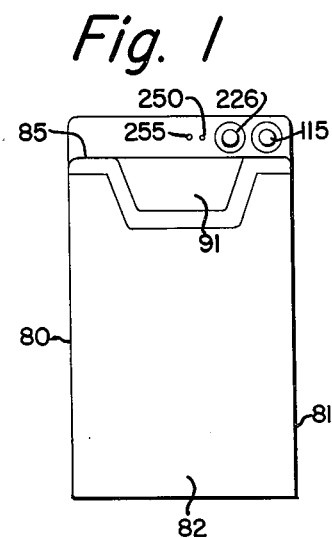
FIGURE 1 is a front elevation of the washer-dryer, washer, or dryer, hereafter referred to only as a washer-dryer, for brevity.
Figure 2:
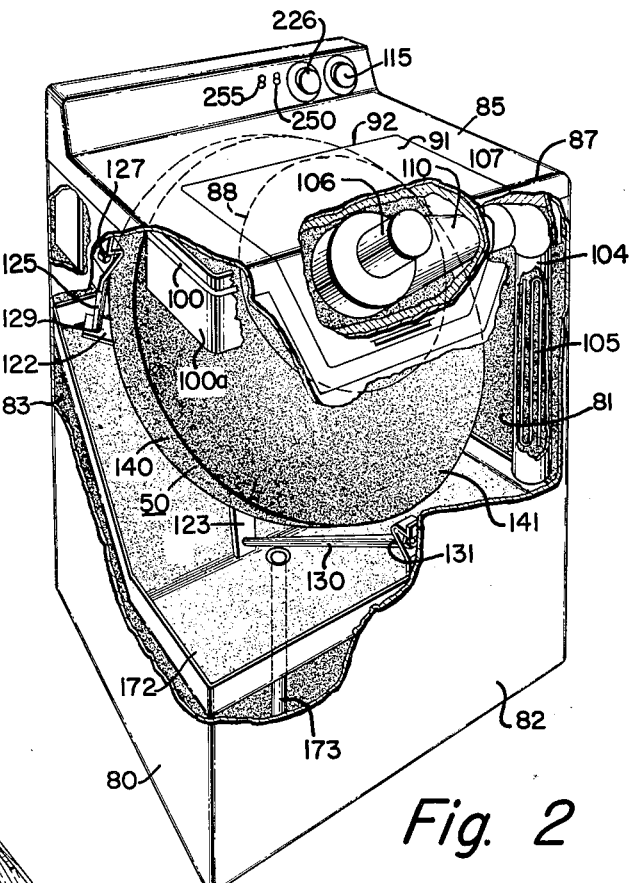
FIGURE 2 is a view in perspective of the washer-dryer shown in FIGURE 1 with parts broken away.
Figure 3:
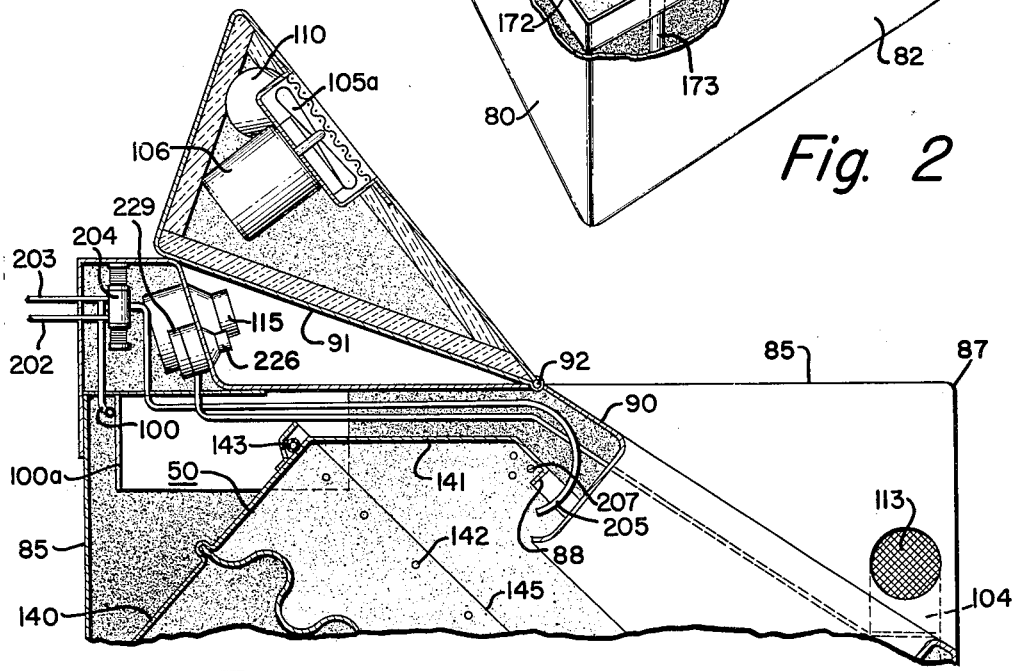
FIGURE 3 is a vertical cross-section of the upper part of the washer-dryer taken generally along the line 3—3 of FIGURE 4.
Figure 9:
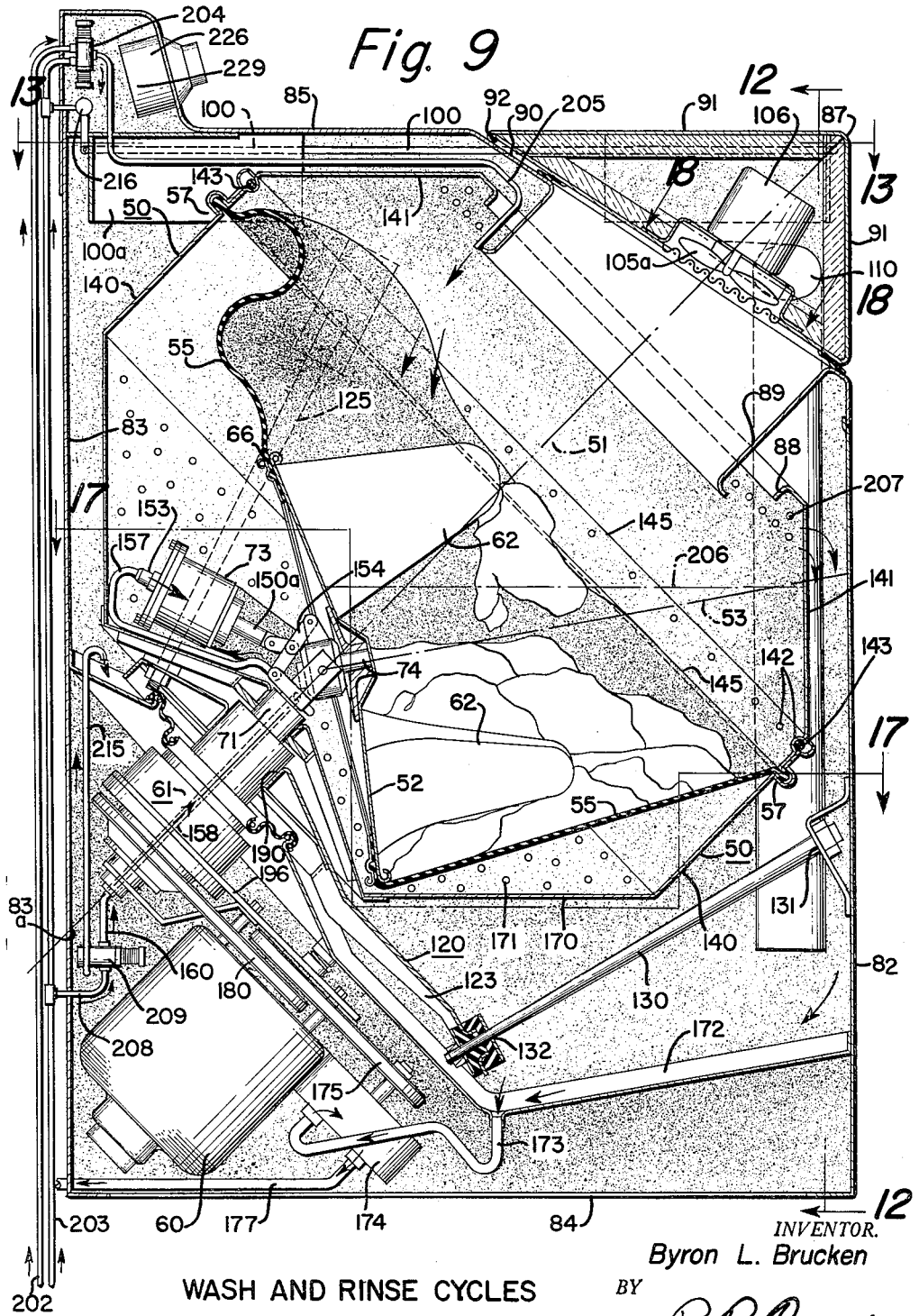
FIGURE 9 is a vertical cross-section taken along the line 9—9 of FIGURES 12 and 13, and showing the machine performing a washing operation.
Figure 10:
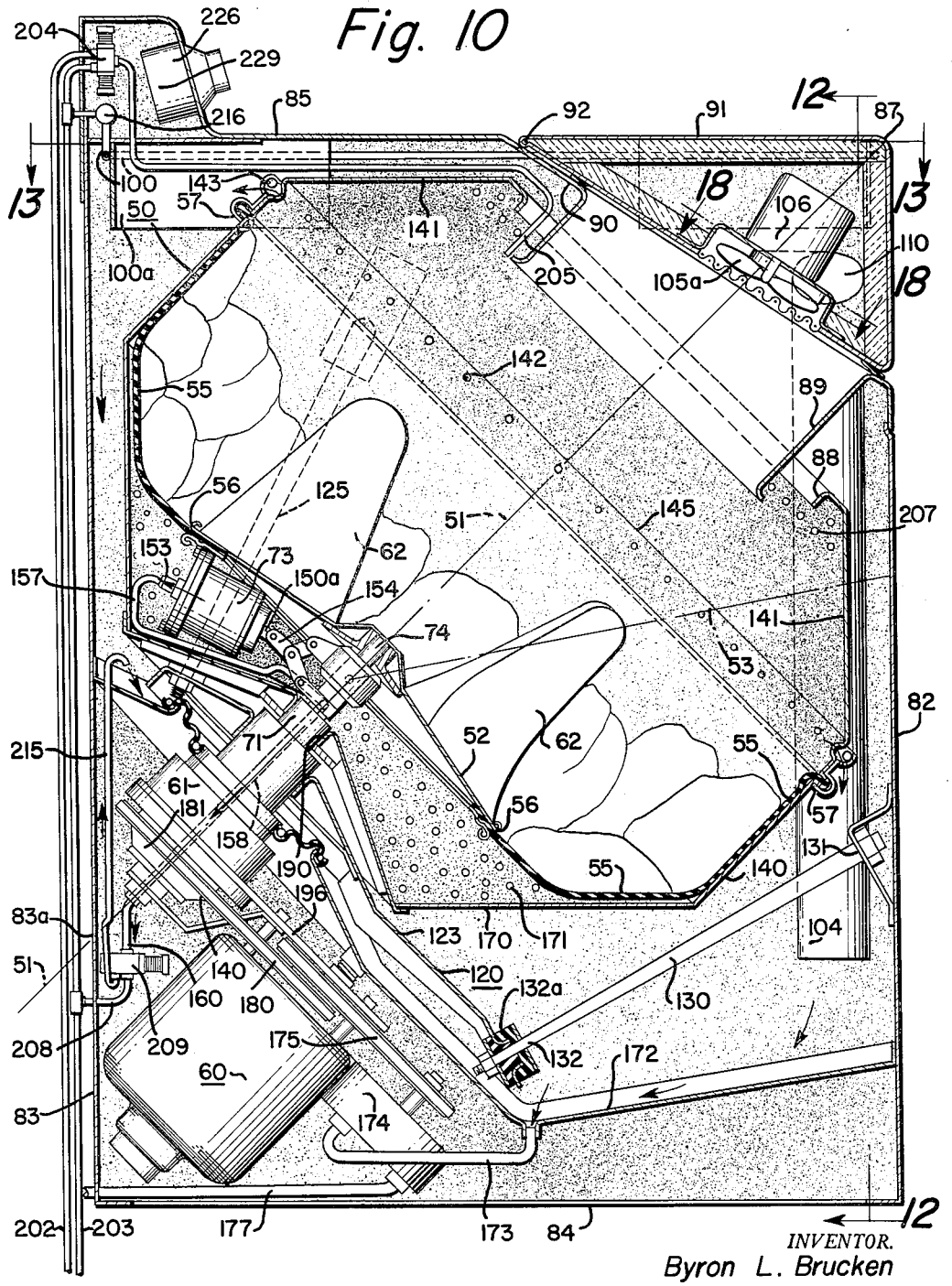
FIGURE 10 is a view similar to FIGURE 9 showing the machine performing a centrifuging operation.
Figure 11:
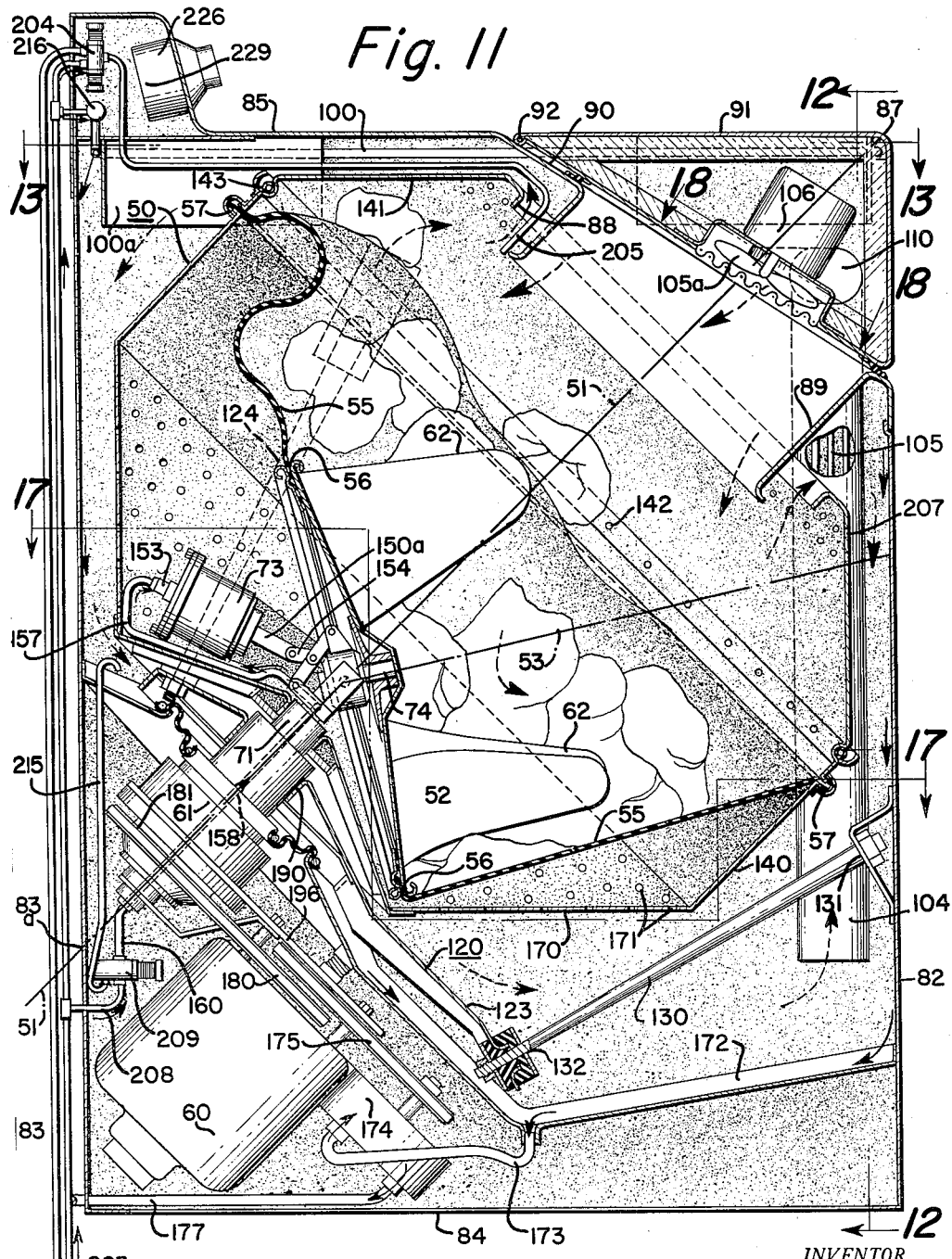
FIGURE 11 is a view similar to FIGURES 9 or 10, showing the machine performing a clothes drying operation.
Figure 12:
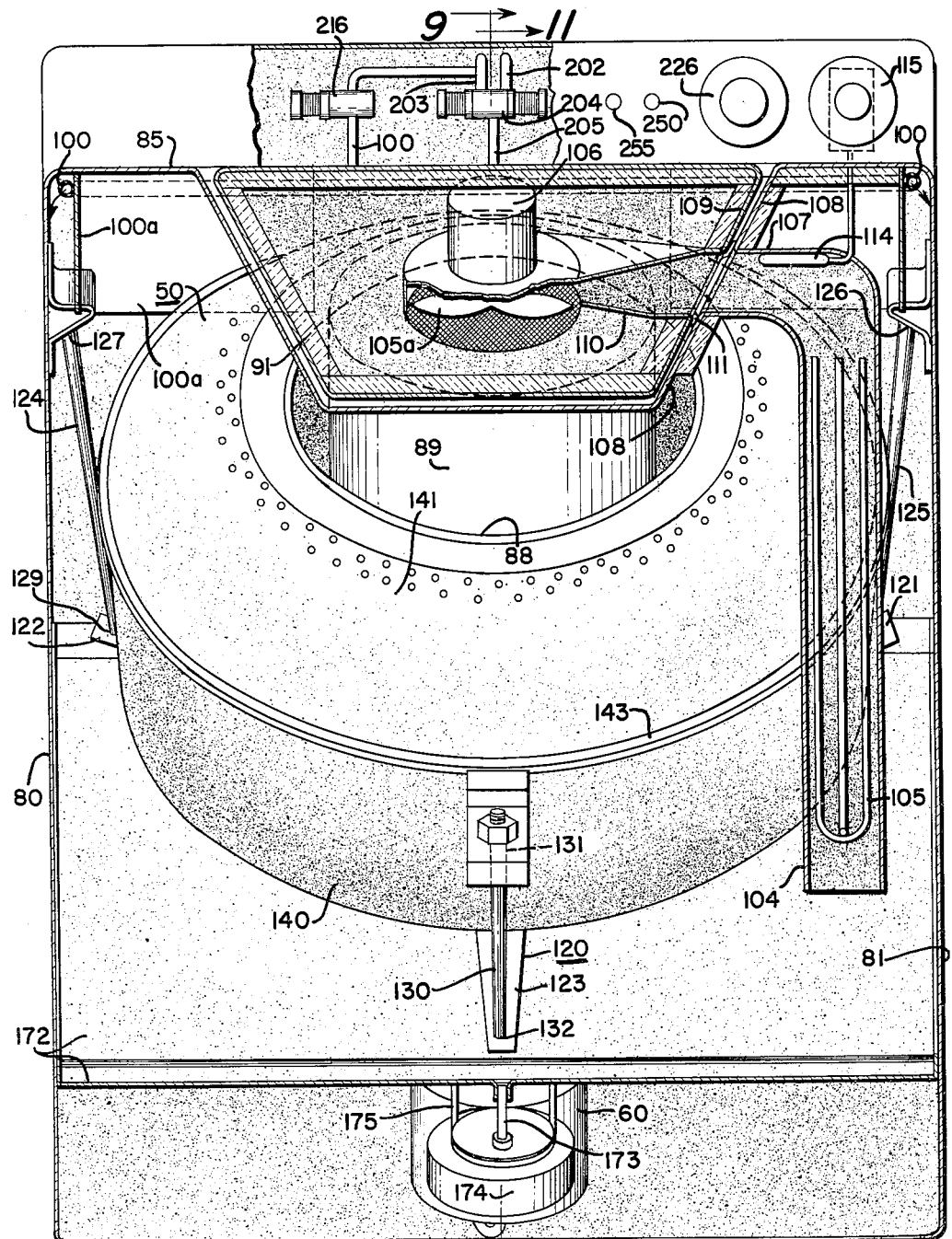
FIGURE 12 is a transverse cross-section taken along the lines 12—12 of FIGURES 9, 10 and 11.
Figure 17:
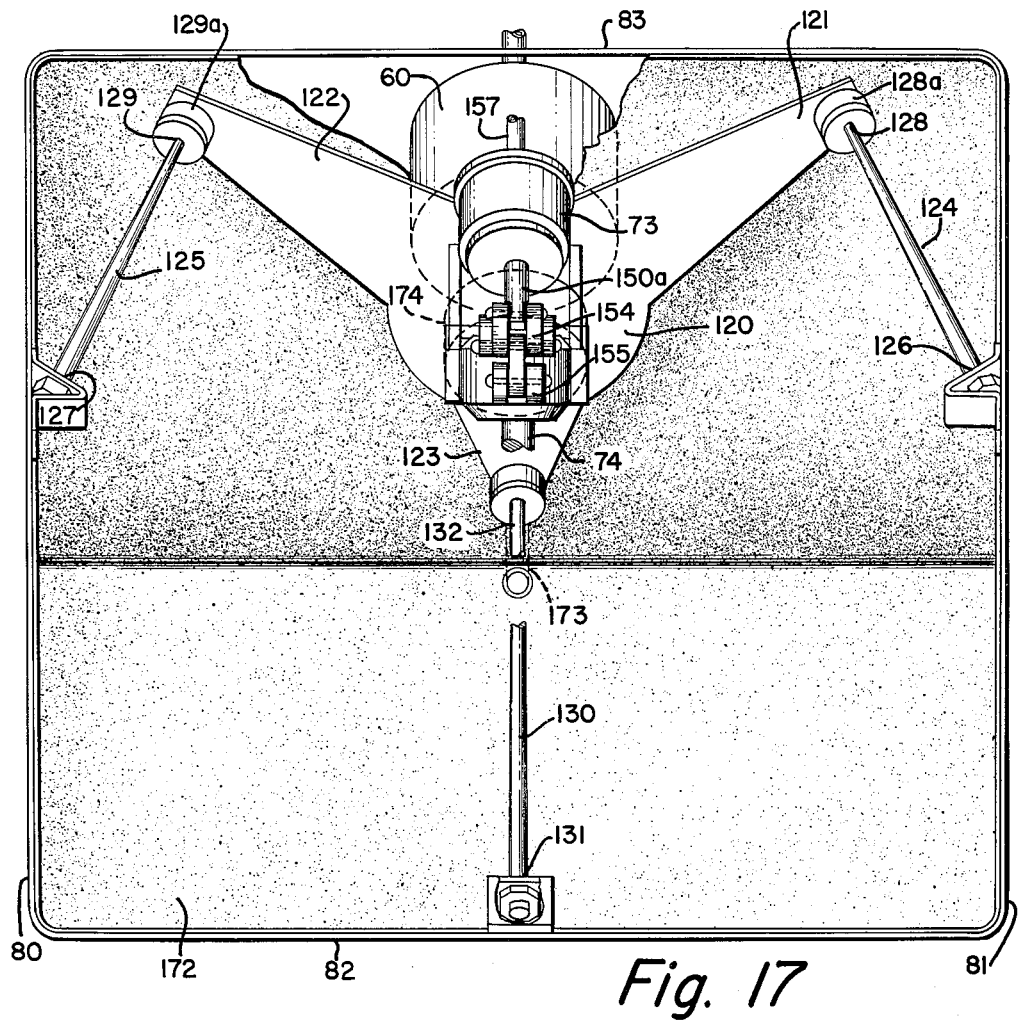
FIGURE 17 is a horizontal cross-section taken along the line 17—17 of FIGURES 9 and 11 showing the tub support.
Figure 18:
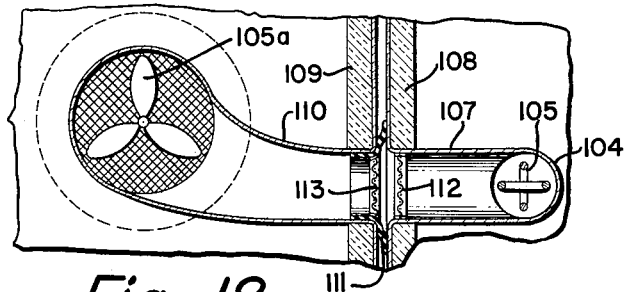
FIGURE 18 is a cross-sectional detail taken along the line 18—18 of FIGURES, 9, 10 and 11 and showing the connection between the air flow conduit in the cabinet and the air flow conduit in the lid.

The plate 52 rotates with its generally flat surfaces substantially at right angles to the inclined axis of the tube for centrifugal extraction, as in FIGURES 10 and 22, and with its flat surface substantially in a vertical position, or almost vertical position, as shown in FIGURES 9, 11 and 21 during the agitating and fluffing actions. The flexible diaphragm 55 is of sufficient size to permit the plate to move between the two positions, is impervious, and is tightly secured to the plate 52 and tub 50, so that it forms with the plate 52, the liquid retaining bottom of the tub 50. The flexible diaphragm 55 perferably extends to the upper edge 57, to insure proper fluffing for drying, as hereafter more fully described.

An inclined stationary shaft 70 extends along an axis 51, about which axis the tub and transmission rotate. A rotatable sleeve 71 has bearing supports 72 between the sleeve and shaft. The tub 50 is secured to the upper end of sleeve 71. An actuator 73 is stationarily mounted on the upper end of shaft 70 within the tub 50. A rockable shaft 74 is pivotally mounted on the inclined shaft 70 within the tub 50 and is rocked by the actuator 73 from the spin position shown in FIGURES 10 and 22, substantially aligned with the inclined stationary shaft 70 to an agitating fluffing position unaligned with the stationary shaft 70 as shown in FIGURES 9, 11 and 21. The plate 52 is carried by the shaft 74 and is rocked by the shaft 74 to the positions heretofore described.

The main body of the casing for the machine is a substantially right angled six-sided paralleleipedon. It has rectangular sides 80, 81, 82 and 83, rectangular bottom or base 84 and a rectangular top 85, and substantially straight edges between them. The tub 50 is mounted to rotate about the inclined axis, which is directed preferably from the lower part 83a (FIGURES 9, 10 and 11) of the back side 83 of the casing toward the opposite forward upper edge 87 of the casing. The tub 50 has a clothes receiving tub opening 88 directed toward the upper edge 87. A loading and unloading funnel 89 is directed toward the tub opening 88 and is supported below the upper edge 87 by means of the inclined wall 90 of the main body of the cabinet. A corner lid 91 is hinged to the casing at 92, so that it covers the funnel 89 when the lid is in closed position and opens the funnel when the lid is in open position. The lid is so shaped that it preserves the symmetry of the upper edge 87 when the lid is in closed position.

The casing has a vapor condenser, which is preferably formed by the cold water spray pipe 100 (FIGURES 2, 8, 9, 10, 11, 12, 13 and 16) extending along the upper horizontal corners of the cabinet, which sprays cold water along the inner surfaces of the casing sides 80, 81, 82 and 83. Short vertical aprons 100a are placed at the upper parts of the vertical corners of the cabinet to prevent inward splashing of the spray. The casing also has an air heater 104, preferably in the form of a vertical cylinder, with electric heater 105 in it. Means are provided for circulating and recirculating air successively through the condenser, heater, corner lid, funnel and tub. Preferably, such air circulating means may take the form of a blower or a fan 105a driven by the motor 106, both of which are mounted in the corner lid 91, as indicated in FIGURES 2, 3 and 9 through 13. The heater 104 has a horizontal bend 107 (FIGURES 2, 3, 12, 13 and 18) which is connected to the recessed cabinet wall 108 which cooperates with the side wall 109 of the corner lid 91. The corner lid 91 has a passageway 110 leading from a point adjacent the bend 107 to the blower or fan 105, so that air flowing upwardly through the heater 104 is directed to the blower or fan 105a and from whence through the funnel 89 through the tub opening 88 and into the tub. A suitable seal 111 is provided adjacent the opening of the passageway 110, to insure proper air flow at this point. If necessary, guarding screens 112 and 113 are provided at these openings. A thermostatic bulb 114 is placed, for example, in bend 107, where heated air from electric heater 105 flows, and this bulb is connected to the thermostatic switch 115, which controls the energization of heater 105 to maintain the heated air at correct temperature.

The main support for the tub includes an inclined metal spider 120 (FIGURES 2, 9, 10, 11, 12, 13, 17, 19 and 20) which has two side arms 121 and 122 directed sidewise and a forward arm 123 directed forwardly of the cabinet. Two side rods 124 and 125 have their upper ends 126 and 127 connected respectively with the side walls 81 and 82 of the casing. Their lower ends 128 and 129 are respectively secured with the side arms 121 and 122 of the spider by rubber-like supports 128a and 129a respectively. A forward rod 130 has its upper end 131 connected to the front side 82 of the casing and its lower end 132 secured to the forward arm 123 of the spider by means of rubber-like support 132a. The spider 120 carries the inclined shaft 70 about which the tub rotates.

The tub 50 has a generally cylindrical side wall 140. The tub also has an upper cone-shaped side wall 141 which connects with the cylindrical wall 140 at 145 and with the tub opening 88. Liquid discharge openings 142 are provided at the intersection of the side walls 140 and 141. A flexible belt 143 is placed around the openings 142, and is of proper tension, to close the openings 142 when the tub is rotating at relatively slow speed during the washing operation, and is centrifugally expanded to open the openings 142 when the tub is rotating at the relatively high speed necessary to centrifuge the clothes. The openings 142 are located in the cylindrical zone 145 which is the greatest effective diameter of the washing action of the tub. The washing action takes place within the bottom part of the tub which includes the plate 52 and diaphragm 55 and the con-shaped side 141.

The actuator 73 preferably is a fluid powered actuator having a piston 150 which reciprocates within the cylinder 151. The piston 150 is pressed outwardly by the spring 152, and is pushed inwardly against the action of spring 152 by fluid entering through the conduit 153. The piston 150, through shaft 150a, actuates the link and toggle construction 154 which rocks the arm 155 carried by the bearing 156 in which the shaft 74 rotates. The fluid to actuate piston 150 flows through conduit 153, pipe 157, bore 158 within the stationary shaft 70, and pipe 160 leading to the controls hereafter more fully described.

Preferably, the tub 50 has a lower supporting cone construction 170 which is perforated at 171, to permit sufficient air flow to the lower side of the diaphragm 55. The casing is provided with a bulkhead 172 which receives all of the water discharged within the washing machine, which water drains through the pipe 173 to the pump 174 driven by the motor 60 through belting 175. The pump 174 discharges through the pipe 177 to a suitable drain or stationary tub or the like.

The two-speed transmission is driven by reversible motor 60 through belt 180 (FIGURES 9, 10, 11, 19, 20, 25 to 28), which drives the pulley 181.

The slow speed drive operates when the motor 60 rotates in a first direction which sends the power through the pulley 181 and its upward cylindrical extension 182 having sun gear teeth 183 meshing with planet gear 184. Gear 184 rolls on stationary internal gear 185 and drives the larger planet gear 186 which, in turn, drives the internally geared ring 187 at relatively slow speed. The ring 187 drives the sleeve 71 and tub 50 through one-way roller clutch 188.

The rotation of tub 50 causes plate 52 to rotate, the turning action passing through diaphragm 55. The turning of plate 52 during the slow drive causes a lifting and tumbling action, which is used for washing or drying the clothes.

The high speed drive operates when the motor 60 rotates in the other direction so that belt pulley 181 drives the sleeve 71 and tub 50 directly through the one-way roller clutch 189. At this time the one-way clutch 188 is in unlocked condition, due to the direction of rotation, and does not drive the sleeve 71.

Figure 19:
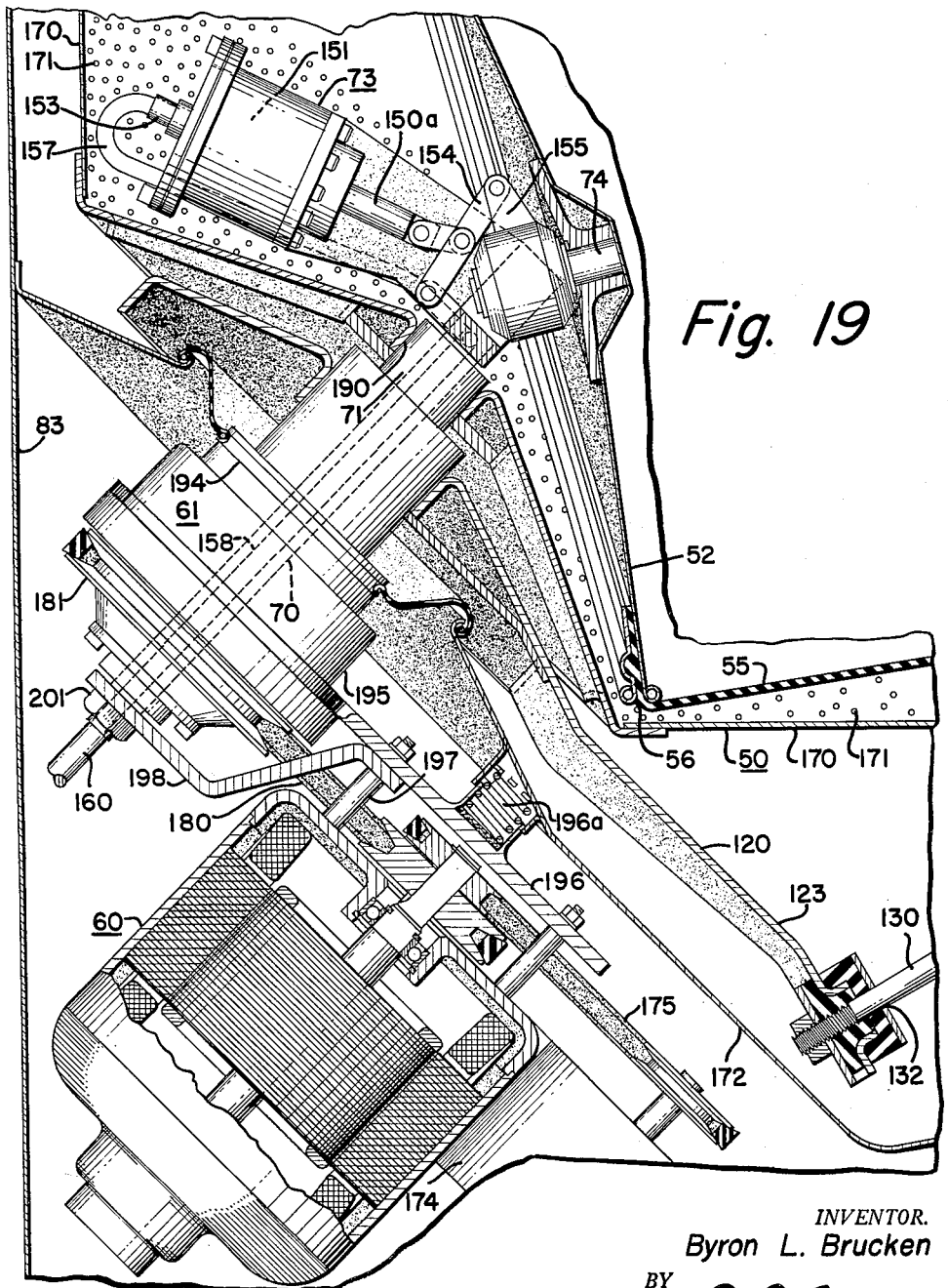
FIGURE 19 is an enlarged vertical cross-section of the motor and tub driving transmission, with parts in elevation.

The transmission is supported by the spider 120, which is secured to the outer drum 190 of thrust ball bearing 191, the internal rings 191a of which are longitudinally locked to the sleeve 71 by the shoulder 192 and nut 193. The lower end of drum 190 is secured to a ring 194 which in turn supports and is bolted to outer casing 195 of the transmission. The casing 195 is bolted to a platform 196 which supports the motor 60 by the bolt and sleeve construction 197. The platform 196 also supports the lower end of inclined shaft 70 by means of a bracket 198 having an opening 199 to receive the shouldered lower end 200 of shaft 70. The end 200 is threaded and receives the flare nut 201 to connect pipe 160 with the fluid passageway 158 in the shaft 70. The platform 196 is resiliently connected with the bulkhead 172 by means of the spring construction 196a (FIGURE 19).

The water flow is fed by the hot and cold water feed lines 202 and 203 respectively (FIGURES 8, 9, 10 and 11).

During the fill and overflow, hot water line 202 (and line 203, if tepid water is desired) feeds water to the mixing and control solenoid valve 204 which discharges into tub fill pipe 205. The tub is filled approximately to the level 206 for the initial fill to a level which overflows through openings 207 during the overflow operation. The tub 50 is rocked to the wash position of FIGURES 9 and 20, since cold water is fed by line 203 through branch 208 and solenoid valve 209 to the pipes or passageways 160, 158, 157 and 153 to cylinder 151 to move piston 150 to the position shown in FIGURE 20, thus causing tub 50 to assume the position of FIGURES 9, 19, 20 and 21. (This same tub position is obtained by the same cold water flow for portions of the drying action later to be described).

The action produced by valve 209 is shown in more detail in FIGURES 21 to 24. The valve 209 has a plunger 210 provided with passageways 211 and 212, and the plunger 210 is reciprocated by solenoid 213.

For the agitation portions of the wash and dry operations of the tub, the solenoid 213 is energized to produce the position of plunger 210 shown in FIGURE 21 so that cold water flows through branch 208, passageway 212, etc., to cylinder 151, and moves piston 150 rightward against spring 152 to move tub shaft 74 as indicated in FIGURE 21. For the spin occurring during the wash and dry operations, the solenoid 213 is deenergized and the spring 214 moves the plunger 210 to the position shown in FIGURE 22. The water pressure in cylinder 151 is released and the spring 152 moves the piston 150 leftward, as shown in FIGURE 22 with the water previously in cylinder 151 flowing through pipes 157, etc., and passageway 211 into pipe 215. This water is discharged into the upper part of bulkhead 172 and flows out drain 173 (FIGURE 10).

During the spin operation, the tub is moved to the position shown in FIGURES 10 and 22 to place the tub axis coaxial with the axis 51 of shaft 70. The water from the tub and wet clothes discharges through openings 142 (FIGURES 10, 14 and 15) when the belt 143 expands outwardly under centrifugal force. The tub 50 is free to gyrate, under the action of unbalance in the load, due to the cantilever support of rods 124, 125 and 130.

During the drying operation, the axis of the tub is returned to the same position by the same water flow into cylinder 151 previously described for the wash operation. The main drying operation with agitation is shown, for example, in FIGURES 11, 19, 20 and 21. The vapor condensing action is produced by the energization of solenoid valve 216 which feeds cold water from line 203 into spray pipes 100. This creates films 217 of cold water on the inner surfaces near the corners of the casing. The vapor carried by the hot air from tub 50 condenses in these cold films 217 and leaves the air with a small amount of vapor, which is then reheated and returned to the tub to absorb more moisture from the air.

For short periods of time during the drying operation, the tub is spun at high speed, with position as shown in FIGURES 10 and 22 by the change of direction of motor 60 and position of actuator 73, while maintaining the heating, air circulating and vapor condensing actions. The operations of the actuator 73 and motor 60 are the same as during the washing operation.

The control for the washer-dryer includes a timer 225, and wiring system as shown in FIGURE 29, which causes the dryer-washer to perform the operations indicated in FIGURE 30. The timer 225 includes a knob 226 secured to the shaft 227 which may be pushed in (to the right in FIGURE 29) to close the line switch 228. The shaft 227 is connected to and is driven by timer motor 229 in step by step progression. In general, the washer timer may be of the construction described and claimed in the patent to K. O. Sisson, 2,549,025, issued April 17, 1951, with additional or substituted cams and switch blades to energize the various elements of the instant washer-dryer causing it to perform the operations indicated in FIGURE 30, or correspondingly similar operations. The instant timer may be provided with cams 229a through 235 to actuate switch blades 236 through 242 respectively.

The initial fill and selective wash time operations of FIGURE 30 are produced partly by cams 234 and 235 of FIGURE 29. These cams may be of construction similar to the initial fill and wash cams of Sisson 2,549,025. Cams 229a, 232 and 233 are also used. The knob 226 turned to the desired time of wash, as indicated in the Sisson patent, and then the knob is pushed in (rightward in FIGURE 29). This closes contacts 228 and 236a by movement of blade 236. The timer motor 229 is energized, and contacts 242a are closed the necessary length of time to energize the hot water solenoid of valve 204 a sufficient length of time to feed hot water from pipe 202 properly to fill the tub. If tepid water is desired for the initial fill, then switch 250 is closed and the cold water solenoid is also energized simultaneously to feed cold water from pipe 203. After the initial fill, contacts 239 are closed to energize solenoid 213 to cause the actuator 73 to rock the shaft as shown in FIGURE 21 to cause agitation. The motor 60 is also energized to rotate forward for slow agitation by the blade 240 which moves contact 240a in the direction to produce slow rotation of the tub. This agitates and washes the clothes. A pause at 13 minutes is obtained by opening the proper contacts, after which contact 240a reverses motor 60 for a short spin.

The overflow without and with agitation indicated beginning between just before 14 minutes in FIGURE 30 is caused by the closing of contacts 241a, if cold rinse is desired. If tepid rinse is desired, contacts 242a are also closed by proper construction of cam 235. Contact 240a is open when no agitation is taking place followed by movement of contact 240a at 16½ minutes to energize motor 60 for agitation. This action continues to the 18½ minute mark on the timer.

The spin between 19 and 25 minutes is produced by opening contacts 241a and 242a and closing 240a to produce "reverse" rotation of motor 60 to produce high speed spin. At this time (as well as at other spin periods, such as at 13 minutes and at 27½ minutes) contact 239a is open to allow solenoid 214 to empty the liquid in actuator 73 and to place the shaft 74 in the spin position shown in FIGURES 10 and 22.

The "wash" operations are completed at 25 minutes as indicated by the double vertical line in FIGURE 30.

The "drying" operations will continue automatically after the "wash" operations if the manual switch 255 has been closed. If the switch 255 had been opened, then the machine would have stopped automatically at 25 minutes by the opening of contacts 236a when the washing operations had been completed. However, if switch 255 is closed, then current flows through contacts 237a, which are closed at 25 minutes and supplies current to timer motor 229 and all the other parts necessary during the drying operation.

The "drying" operation actually overlaps the final spin of the "wash" operation beginning at 19 minutes at which time the heater 104, blower 106 and condenser spray 100 are turned on by the closing of contacts 238a and 238b simultaneously to spin and initially to heat the clothes. At 25 minutes, a short agitation is produced by causing the motor 60 to rotate in a "forward" direction through the changing of the position of contact 240a while also changing the position of shaft 74 to produce tumbling. A slight pause occurs at 27½ minutes when motor 60 is deenergized followed by a short spin from 27½ to 30 minutes with simultaneous heating, blowing and condensing action, which is accomplished by changing the direction of rotation of motor 60 and position of shaft 74 while maintaining contacts 238a and 238b closed.

At 30 minutes combined agitation is restored by changing rotation of motor 60 and position of shaft 74 by movement of contacts 240a and 239a respectively. This action continues to the final stop position of the knob 226, or it may stop at a selected manual stop or an automatic dryness stop by the use of the features disclosed in the copending application of Robert R. Candor, Serial No. 440,047, filed June 29, 1954, and now abandoned, for Domestic Appliance.

While certain specific minute intervals have been referred to, this is only for the purpose of illustration, and corresponding or different intervals may be used, if desired.

In the operation of the washer-dryer, the lid 91 is opened, and clothes are inserted through the funnel 89 into the tub 50, along with the necessary detergent. Thereafter, water is introduced through the pipe 205 (FIGURES 3, 8, 9, 10 and 11) into the tub 50, until the tub is filled to the level indicated by the line 206. Thereafter, the tub is rotated at slow speed to produce agitation while the plate 52 is in the position shown in FIGURE 9. The washing action proceeds as illustrated in said FIGURE 9. Some of the water spills through openings 207 at the upper end of cone 141. After a suitable length of time, such as three minutes of fill and ten minutes of agitation, there is a short spin of slightly less than a minute to empty the main body of wash water. Thereafter, the pip 205 discharges clear water into the tub while the tub is stationary to produce an overflow which discharges the floating impurities and thereafter the tub is again slowly rotated for agitation while water continues to be discharged by the pipe 205 to provide further overflow action until the 18½ minute mark. Thereafter, the water feed is discontinued and the tub is rotated at high speed for a centrifuging action. Thereafter, if desired, further rinses may be performed by feeding water and agitating the clothes, followed by further centrifuging action. However, if the first overflow action is continued sufficiently long, such additional rinses may be omitted. Thereafter, a drying cycle may proceed.

The construction of the flexible diaphragm 55 insures proper fluffing of the clothes during the drying operation. Since the diaphragm 55 extends from the edge 56 to the edge 57, the clothes tend to arrange themselves in the form of a ring, as shown in FIGURE 10 during the spin operation, riding on the diaphragm 55. When the plate 52 is moved to the drying position shown in FIGURE 11, the wall of the diaphragm 55 is continuously flexed during the slow rotation action. This continuous flexing breaks the tendency of the clothes to cling to the sides of the machine, and insures an efficient and free tumbling action. This permits thorough drying of the clothes by the warm, dry air.

If desired, the drying cycle can overlap the washing cycle to the extent that heated air is introduced beginning at the time the centrifugal speed starts. The heated air is blown into the tub and is recirculated past the vapor condenser and air heater continuously from the time that the tub is centrifuging the clothes and the air flow continues while the tub action is changed from the high speed centrifugal action to a slow speed free fluffing action following the centrifugal spin. After a short fluffing action, a second and short centrifugal action takes place after which the tub is again slowed to the slow rotation and fluffing action for an extended period of time, until the machine is manually stopped at a selected time, or automatically stopped by the thermostat or similar automatic stop or to the final stop provided by the limit of the timer.

While the form of embodiment of the invention as herein disclosed constitutes a preferred form, it is to be understood that other forms might be adopted as may come within the scope of the claims which follow.

What is claimed is as follows:

1. In combination: a tub mounted to rotate about an inclined fixed axis; a plate within said tub; a bearing means for rotatably supporting said plate and providing an axis of rotation, means for pivotally mounting said bearing means upon a pivoting axis transverse to the axis of said bearing means to provide a position in which the axis of said bearing means is substantially parallel to said inclined axis; means to move said bearing means from a position substantially parallel to said inclined axis to a position at an angle to said inclined axis; and a flexible diaphragm connected to the outer edge of said plate and to the side wall of said tub remote from said plate cooperating with the plate and the tub to form a clothes retaining receptacle.

2. In combination: a tub mounted to rotate about an inclined fixed axis; means for rotating said tub at relatively slow speed for agitation, and at relatively high speed for centrifugal extraction; a substantially flat plate within said tub; a bearing means for rotatably supporting said plate and providing an axis of rotation, means for pivotally mounting said bearing means upon a pivoting axis transverse to the axis of the bearing means and said inclined axis to provide a position in which the axis of said bearing means is substantially parallel to said inclined axis; means to move said bearing means from a position substantially parallel to said inclined axis to a relatively fixed position at an angle to said inclined axis to cause said plate to rotate respectively with its flat surface substantially at right angles to said inclined axis for centrifugal extracion, and with its surface substantially vertical for agitation; and a flexible diaphragm connected to the outer edge of said plate and to the side wall of said tub to form with said plate the liquid retaining bottom of said tub.

3. In combination: a tub mounted to rotate about an inclined fixed axis; means for rotating said tub at relatively slow speed for agitation, and at relatively high speed for centrifugal extraction; a substantially flat plate within said tub; clothes lifting vanes on said plate; a bearing means for rotatably supporting said plate and providing an axis of rotation, means for pivotally mounting said bearing means upon a pivoting axis transverse to the axis of the bearing means and said inclined axis to provide a position in which the axis of said bearing means is substantially parallel to said inclined axis; means to move said bearing means from a position substantially parallel to said inclined axis to a relatively fixed position at an angle to said inclined axis to cause said plate to rotate respectively with its flat surface substantially at right angles to said inclined axis for centrifugal extraction, and with its surface substantially vertical for agitation; and a flexible diaphragm connected to the outer edge of said plate and to the side wall of said tub to form with said plate the liquid retaining bottom of said tub.

4. In combination: an inclined stationary shaft; a rotatable sleeve around said shaft; a rotatable tub secured to said sleeve; an actuator stationarily mounted on said shaft within said tub; a rockable shaft mounted on said inclined shaft within said tub and connected to and rocked by said actuator from a spin position substantially aligned with said inclined stationary shaft to an agitating position unaligned with said stationary shaft; a plate carried by said rockable shaft within said tub; a flexible diaphragm connected to the outer edge of said plate and to the side wall of said tub to form with said plate the liquid retaining bottom of said tub; and means for rotating said sleeve and tub at relatively slow speed for agitation, and at relatively high speed for centrifugal agitation.

5. In combination: an inclined stationary shaft; a rotatable sleeve around said shaft; a rotatable tub secured to said sleeve; an actuator stationarily mounted on said shaft within said tub; a rockable shaft mounted on said inclined shaft within said tub and connected to and rocked by said actuator from a spin position substantially aligned with said inclined stationary shaft to an agitating position unaligned with said stationary shaft; a plate carried by said rockable shaft within said tub; a flexible diaphragm connected to the outer edge of said plate and to the side wall of said tub to form with said plate the liquid retaining bottom of said tub; and a two-speed transmission connected to said sleeve to drive said tub at relatively slow speed for agitation, and at relatively high speed for centrifugal agitation.

6. In combination: a casing having substantially rectangular sides, bottom and top, and straight edges; a tub mounted to rotate about an inclined axis directed from the lower part of a side of said casing toward an opposite upper edge of said casing, said tub having a clothes receiving tub opening directed toward said opposite upper edge; a plate within said tub; a bearing means for rotatably supporting said plate and providing an axis of rotation, means for pivotally mounting said bearing means upon a pivoting axis transverse to the axis of the bearing means; means to move said bearing means from a position substantially parallel to said inclined axis to a position at an angle to said inclined axis; a flexible diaphragm connected to the outer edge of said plate and to the side wall of said tub remote from said plate cooperating with the plate and the tub to form a clothes retaining receptacle; a loading and unloading funnel directed toward said tub opening and supported below said opposite upper edge; a wedge shaped corner lid hinged to said casing, covering said funnel and forming said opposite upper edge; said lid having an air passage, a vapor condenser in said casing; an air heater in said casing; and means circulating and recirculating air successively through said condenser, heater, corner lid, funnel and tub.

7. In combination: a casing having substantially rectangular sides, bottom and top, and straight edges; a tub mounted to rotate about an inclined axis directed from the lower part of a side of said casing toward an opposite upper edge of said casing, said tub having an inclined clothes receiving tub opening directed toward said opposite upper edge; means for rotating said tub at relatively slow speed for agitation, and at relatively high speed for centrifugal extraction; a substantially flat plate within said tub; clothes lifting vanes on said plate; a bearing means for rotatably supporting said plate and providing an axis of rotation, means for pivotally mounting said bearing means upon a pivoting axis transverse to the axis of the bearing means; means to move said bearing means from a position substantially parallel to said inclined axis to a position at an angle to said inclined axis to cause said plate to rotate respectively with its flat surface substantially at right angles to said inclined axis for centrifugal extraction, and with its surface substantially vertical for agitation; a flexible diaphragm connected to the outer edge of said plate and to the side wall of said tub remote from said plate to form with said plate the liquid retaining bottom of said tub; an inclined loading and unloading funnel directed toward said tub opening and supported below said opposite upper edge; a wedge shaped corner lid hinged to said casing, covering said funnel and forming said opposite upper edge; said lid having an air passage, a vapor condenser in said casing; an air heater in said casing; and means circulating and recirculating air successively through said condenser, heater, corner lid, funnel and tub.

8. In combination: a stationary inclined shaft; a rockable shaft pivoted at the upper end of said inclined shaft; a plate carried by and rotatably mounted upon said rockable shaft; an actuator stationarily carried at the upper end of said inclined shaft for rocking said rockable shaft to a plurality of different positions comprising a position in which its axis is aligned with the axis of said inclined shaft and a position in which its axis is nearer horizontal; a sleeve surrounding and rotatably mounted upon said inclined shaft; a tub carried by said sleeve and in which said plate is positioned; said tub having side walls, diaphragm means operably connecting said plate and said tub to form with the tub a clothes retaining receptacle, and means to rotate said sleeve.

9. In combination: a stationary inclined shaft; a rockable shaft pivoted at the upper end of said inclined shaft; a plate carried by and rotatably mounted upon said rockable shaft; a fluid powered actuator stationarily carried at the upper end of said inclined shaft for rocking said rockable shaft to a plurality of different positions relative to said inclined shaft; a fluid conduit for said actuator extending along said inclined shaft; a sleeve surrounding and rotatably mounted upon said inclined shaft; a tub carried by said sleeve and in which said plate is positioned; said tub having side walls, diaphragm means operably connecting said plate and said tub to form with the tub a clothes retaining receptacle, and means to rotate said sleeve.

10. A laundry appliance including a tub, means for rotatably mounting said tub upon a first axis, a member within the tub, a flexible diaphragm connecting said member and the tub cooperating with said member and said tub to form a clothes retaining receptacle, a bearing for rotatably supporting said member upon a second axis, means for changing the angularity of said bearing relative to said first axis, means for rotating said tub at a plurality of speeds, means for filling the tub, and a timing control means for rendering effective said filling means and said angularity changing means and said rotating means.

11. A laundry appliance including a tub, means for rotatably mounting said tub upon a first axis, a member within the tub, a flexible diaphragm connecting said member and the tub, a bearing for rotatably supporting said member upon a second axis cooperating with said member and said tub to form a clothes retaining receptacle, means for changing the angularity of said bearing relative to said first axis, means for rotating said tub at a plurality of speeds, means for filling the tub, and a timing control means for rendering effective said angularity changing means to hold said second axis at an angle to the first axis and simultaneously to render effective said rotating means to rotate said tub and said member at a low speed.

12. A laundry appliance including a tub, means for rotatably mounting said tub upon a first axis, a member within the tub, a flexible diaphragm connecing said member and the tub cooperating with said member and said tub to form a clothes retaining receptacle, a bearing for rotatably supporting said member upon a second axis, means for changing the angularity of said bearing relative to said first axis, means for rotating said tub at a plurality of speeds, means for filling the tub, and a timing control means for rendering effective said angularity changing means to hold said second axis at an angle to the first axis and simultaneously to render effective said rotating means to rotate said tub and said member at a low speed and thereafter for rendering effective said angularity changing means to hold said second axis parallel to said first axis and simultaneously to render effective said rotating means to rotate said tub and said member at a higher speed.

13. In combination: a stationary inclined shaft; a rockable shaft pivoted at the upper end of said inclined shaft; a plate carried by and rotatably mounted upon said rockable shaft; an actuator stationarily carried at the upper end of said inclined shaft and rocking said rockable shaft to a plurality of different positions comprising a position in which its axis is aligned with the axis of said inclined shaft and a postion in which its axis is nearer horizontal; a sleeve surrounding and rotatably mounted upon said inclined shaft; and a tub carried by said sleeve and in which said plate is positioned; means to rotate said sleeve; and imperforate diaphragm means operably connecting said plate and said tub cooperating with said member and said tub to form a clothes retaining receptacle.

14. In combination: a stationary inclined shaft; a rockable shaft pivoted at the upper end of said inclined shaft; a plate carried by and rotatably mounted upon said rockable shaft; an actuator stationarily carried at the upper end of said inclined shaft and rocking said rockable shaft to a plurality of different positions comprising a position in which its aixs is aligned with the axis of said inclined shaft and a position in which its axis is nearer horizontal; a sleeve surroundng and rotatably mounted upon said inclined shaft; a tub carried by said sleeve and in which said plate is positioned, said tub having side walls, diaphragm means operably connecting said plate and said tub to form with the tub a clothes retaining receptacle; and means to rotate said sleeve; said plate having agitating vanes thereon.

References Cited in the file of this patent

UNITED STATES PATENTS

| | | |
|---|---|---|
| 1,807,214 | Jaxheimer | May 26, 1931 |
| 2,106,986 | Pearce | Feb. 1, 1938 |
| 2,328,256 | Breckenridge | Aug. 31, 1943 |
| 2,349,901 | Breckenridge | May 30, 1944 |
| 2,498,544 | Gerhardt | Feb. 21, 1950 |
| 2,566,488 | Gould | Sept. 4, 1951 |
| 2,579,310 | Dunham | Dec. 18, 1951 |
| 2,610,497 | Graham | Sept. 16, 1952 |
| 2,611,256 | Candor | Sept. 23, 1952 |
| 2,637,186 | Douglas | May 5, 1953 |
| 2,637,189 | Douglas | May 5, 1953 |
| 2,645,111 | Fields | July 14, 1953 |
| 2,645,548 | Kreitchman | July 14, 1953 |
| 2,647,387 | Lund | Aug. 4, 1953 |
| 2,652,708 | Rimsha et al. | Sept. 22, 1953 |
| 2,665,575 | Cockerill et al. | Jan. 12, 1954 |
| 2,683,535 | Smith | July 13, 1954 |
| 2,687,633 | Sharp et al. | Aug. 31, 1954 |
| 2,704,157 | Hertrich | Mar. 15, 1955 |
| 2,711,827 | Smith | June 28, 1955 |
| 2,715,826 | Kirby | Aug. 23, 1955 |
| 2,737,799 | Knipmeyer | Mar. 13, 1956 |
| 2,785,557 | Stilwell | Mar. 19, 1957 |